Patented July 21, 1931

1,815,554

UNITED STATES PATENT OFFICE

ALFRED ENGELHARDT, OF WIESDORF, NEAR COLOGNE, GERMANY, ASSIGNOR, BY MESNE ASSIGNMENTS, TO AMERICAN LURGI CORPORATION, OF NEW YORK, N. Y., A CORPORATION OF NEW YORK

PROCESS FOR SEPARATING ORGANIC GASES OR VAPORS OF ORGANIC PRODUCTS

No Drawing. Application filed August 11, 1921, Serial No. 491,618, and in Germany November 3, 1916.

This invention relates to the separation and isolation of organic gases or vapors of organic products from their mixtures with air or other gases, such as hydrogen which are not absorbable or are only absorbable with difficulty. The new process consists in causing such mixtures to react upon a specially porous active carbon such as can be obtained e. g. by the process described in the German specification No. 290,656, of 25th April, 1914, or No. 307,761 of 18th June, 1917.

According to German Patents No. 290,656 and No. 307,761 highly active porous carbon is obtained by heating a carbon-containing substance, e. g. wood, cellulose, starch, coal, offall, etc., with a dehydrating agent, e. g. zinc chloride.

In order to illustrate the new process more fully the following example is given, the parts being by weight:—A mixture of acetone with air (obtained by leading air through cold acetone) is led through a cylindrical tube filled with charcoal prepared as described in German specification No. 290,656, of 25th April, 1914, or No. 307,761, of 18th June, 1917, 1000 parts of the charcoal retain 505 parts of acetone. By distillation with steam or superheated steam (heated to 160–180° C.) an aqueous solution of acetone is obtained. The charcoal is then treated with air heated to 120° C. It can then at once be used over again for a second charge. Superheated vapors of organic compounds can also be used instead of steam.

In the same way other organic products can be separated from gas mixtures etc. such as methane, ethylene, acetylene, cyanogen or ether, methyl- or ethyl-alcohol, benzene, benzine, acetic acid ester, acetic acid, etc.

I claim:—

1. In a process of separating gases, passing a gaseous mixture into activated carbon and removing the adsorbable portion from said gaseous mixture by the activated carbon while allowing the unadsorbable portion to pass, expelling the adsorbed portion from the activated carbon by introducing steam into the carbon carrying the adsorbed gaseous material, cooling and collecting the gaseous matter thus expelled.

2. In a process of separating gases, passing a gaseous mixture into activated carbon and removing the adsorbable portion from said gaseous mixture by the activated carbon while allowing the unadsorbable portion to pass, expelling the adsorbed portion from the activated carbon by introducing steam into the carbon carrying the adsorbed gaseous material, and liquefying the gaseous matter thus expelled with the aid of cooling.

In testimony whereof I have hereunto set my hand.

ALFRED ENGELHARDT. [L. S.]